UNITED STATES PATENT OFFICE.

GASTON GUIGNARD, OF PARIS, FRANCE.

PROCESS OF PURIFYING CRUDE ALCOHOL.

SPECIFICATION forming part of Letters Patent No. 432,198, dated July 15, 1890.

Application filed August 24, 1888. Serial No. 283,635. (No specimens.) Patented in England May 8, 1888, No. 6,869, and in Germany May 13, 1888, No. 46,627.

*To all whom it may concern:*

Be it known that I, GASTON GUIGNARD, a citizen of the Republic of France, and a resident of Paris, in the said Republic, have invented a certain new and useful Improvement in the Process of Purifying Crude Alcohols, (for which patents in Great Britain No. 6,869, dated May 8, 1888, and in Germany, No. 46,627, dated May 13, 1888, have been obtained,) of which the following specification is a full, clear, and exact description.

This invention relates to a new or improved process for the purification of crude alcohols of industry in general, which process consists, essentially, in separating the alcohol from the aldehydes, acetones, &c., which generally accompany it, by forming stable combinations with these impurities by the action of alkaline sulphites and bisulphites on the crude alcohol. The aldehydes and acetones give with bisulphites crystalline compounds little soluble in alcohol, but slightly soluble in water, and less soluble in a concentrated lye of alkaline bisulphite, and it is this property which I have applied to the treatment of impure alcohols, making it the basis of a process which will be described in detail.

In treating aldehydes or acetones with bisulphite of soda for their purification a crystalline compound is produced, which is collected and purified, while the mother-liquids are rejected. In the new process for purifying alcohols, on the contrary, the mother-liquids from treating the impure alcohols with the alkaline bisulphites are preserved for further treatment in order, as set forth below, to extract the alcohol therefrom in a chemically pure state, and the aldehyde sulphites, which constitute the residue of the operation, are treated, as will be indicated, for the separation of the aldehyde in a commercial state. The process, as a whole, thus consists in obtaining, on the one hand, alcohol in a state of purity, and on the other producing commercial aldehyde.

This process as a whole and its several new steps or combinations of steps constitute the invention.

Having explained the general principles of the new process, the series of operations by which the same is carried into effect in an industrial manner will now be described, taking as an example the treatment of crude ethylic alcohol of industry, the treatment of other alcohols being effected under analogous conditions. The crude alcohols to be purified are in the first place conducted into a preparatory apparatus or still designed to separate them into lighter portions containing the aldehydes, acetones, &c., and less volatile portions which remain in the heater and which contain the balance of the alcohol. This separation is pushed until the alcohols remaining in the apparatus contain neither aldehyde nor acetone, of which condition it is well to determine by qualitative tests by means of customary reactions, such as those indicated by Tollens, Barady, and others. The lighter portions of the alcohols thus contain all the aldehydes which contaminate the crude alcohol. They are placed in vessels and therein treated with a concentrated lye, of about 30° Baumé, of alkaline bisulphite in sufficient quantity to form the aldehyde sulphites and acetone sulphites and leave a slight excess of alkaline sulphite in the liquor. A preliminary test will determine the quantity necessary. In case the presence of butylic aldehyde has been found in the crude alcohol some neutral sulphite should be added to the bisulphite, since it forms with this aldehyde a more stable combination that the bisulphite. This addition should be made in the proportion necessary to form with the butylic aldehyde the definite compound corresponding to the ordinary aldehyde sulphites. Under these conditions the aldehydes and the acetones combine with the bisulphites or sulphites and produce crystals of these compounds or not, according to the proportion of the aldehyde contained in the liquid and the solubility of the compounds.

Whether there is a production of crystals or not the entire mass is conducted into a distilling apparatus, where all the alcohol is distilled off. Since it passes off contaminated with sulphurous acid, the distillate is redistilled in presence of any suitable base—soda, potash, or lime—and the alcohol thus produced is chemically pure. After distilling off the alcohol from the mass obtained by the treatment with the alkaline sulphite or bisulphite there remains in the heater a liquid containing aldehyde sulphites and acetone sulphites, which is treated by known means for extracting the aldehydes and acetones.

This process of purifying crude alcohols permits, therefore, as a direct consequence of said process the recovery of the aldehydes and acetones, which have only been obtained heretofore by a special process—namely, by the oxidation of the corresponding alcohols.

The less volatile portion of the alcohols deprived of the lighter products (of which latter the treatment has just been given) and containing the rest of the alcohol is rectified by ordinary processes.

I claim as my invention or discovery—

1. The process of separating the aldehydes or like products from alcohols in general, and the alcohols of the distillery in particular, through the formation of sulphite compounds of the aldehydes or like products by treating the crude or impure alcohol with alkaline bisulphite or alkaline sulphite and bisulphite to form said sulphite compounds and separating such compounds and the alcohol from each other, substantially as described.

2. The process of separating aldehydes and acetones from alcohols by treating the alcohols containing such liquids with alkaline bisulphites or with alkaline sulphites and bisulphites, and distilling off the alcohols from the aldehyde sulphites and acetone sulphites thus formed, substantially as described.

3. The process of purifying crude alcohols, consisting in eliminating the aldehydes and acetones with a portion of the alcohol, transforming the aldehydes and acetones of the eliminated portion into their sulphite compounds by means of a concentrated lye of alkaline bisulphite, containing also neutral sulphite when there is butylic aldehyde in crude alcohol, distilling off the alcohol from the sulphite compounds, and redistilling the alcohol distillate, with a base to remove the sulphurous acid therefrom, substantially as described.

4. The process of treating crude or impure alcohol by first separating the aldehyde and acetones from the alcohol with alkaline bisulphite or alkaline sulphite and bisulphite, and then removing the sulphurous acid from the alcohol, substantially as described.

5. The process of treating crude or impure alcohol by first separating the aldehyde and acetones from the alcohol with alkaline bisulphite or alkaline sulphite and bisulphite, and then removing the alkaline sulphite from the aldehyde and acetones, substantially as described.

6. The process of treating crude or impure alcohol by first separating the aldehyde and acetones from the alcohol with alkaline bisulphite or alkaline sulphite and bisulphite, and then removing the sulphurous acid from the alcohol and the alkaline sulphite from the aldehyde and acetones, substantially as described.

In testimony whereof I have signed this specification in the presence of two subscribing witnesses.

GASTON GUIGNARD.

Witnesses:
ROBT. M. HOOPER,
EUGENÉ DUBOIS.